(12) United States Patent
Nakahama

(10) Patent No.: US 9,696,231 B2
(45) Date of Patent: Jul. 4, 2017

(54) MACHINE TOOL HAVING NUMERIC CONTROL DEVICE

(71) Applicant: FANUC Corporation, Yamanashi (JP)

(72) Inventor: Yasuhiro Nakahama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 169 days.

(21) Appl. No.: 14/567,231

(22) Filed: Dec. 11, 2014

(65) Prior Publication Data

US 2015/0177090 A1 Jun. 25, 2015

(30) Foreign Application Priority Data

Dec. 20, 2013 (JP) ................................. 2013-264191

(51) Int. Cl.
*G01M 1/12* (2006.01)
(52) U.S. Cl.
CPC .................................. *G01M 1/122* (2013.01)
(58) Field of Classification Search
CPC ...................................................... G01M 1/122
See application file for complete search history.

(56) References Cited

U.S. PATENT DOCUMENTS

2006/0232025 A1* 10/2006 Braud ...................... B60G 9/02
280/5.508
2011/0196623 A1* 8/2011 Hakkinen ............. B60P 1/6463
702/41

FOREIGN PATENT DOCUMENTS

| JP | 1-193134 A | 8/1989 |
| JP | 8-190433 A | 7/1996 |
| JP | 9-131690 A | 5/1997 |
| JP | 2004-191221 A | 7/2004 |
| JP | 2005-131715 A | 5/2005 |
| JP | 2010-211467 A | 9/2010 |

OTHER PUBLICATIONS

Kurtus, Ron, webpage titled "Center of Gravity", Aug. 25, 2010, www.school-for-champions.com/science/gravity_center.htm.*
Office Action mailed May 19, 2015, corresponding to Japanese patent application No. 2013-264191.

* cited by examiner

*Primary Examiner* — Paul West
(74) *Attorney, Agent, or Firm* — Hauptman Ham, LLP

(57) ABSTRACT

A machine tool having a numeric control device is configured such that a storage unit of the numeric control device stores a weight and a position of a center of gravity of a fixed unit and a movable unit of the machine tool, and the position of the center of gravity of the entire set including the machine tool and the load is calculated using the weights and the positions of the center of gravity, the weight and the position of the center of gravity of the load, and a relative position of the movable unit of the machine tool.

10 Claims, 3 Drawing Sheets

MACHINE TOOL HAVING NUMERIC CONTROL DEVICE

RELATED APPLICATIONS

The present application claims priority to Japanese Application Number 2013-264191, filed Dec. 20, 2013, the disclosure of which is hereby incorporated by reference herein in its entirety.

BACKGROUND OF THE INVENTION

Field of the Invention

The present invention relates to a machine tool having a numeric control device, and more particularly, a machine tool having a numeric control device having a function for notifying information about the position of the center of gravity of a main body.

Description of the Related Art

When a machine tool is relatively small and light weight, the machine tool is often moved a short distance. Another moving method includes a method for lifting the machine tool using a crane and the like, or raising the machine using lifts such as a dolly, a forklift, and a hand lift. In particular, since the lift itself is small, the method using the lift is often used for a work of moving and installing the machine in a relatively short distance such as within a building of a factory and the like.

As described above, when raising the machine using the lift, it is necessary to determine the position and the width of the fork so that the center of gravity of the machine is located between the two forks provided with the lift, in order to prevent the falling accident of the machine and the like. When the positions or the width of the fork are thus determined, it is necessary to find the position of the center of gravity of the machine.

JP 2005-131715 A discloses a transport auxiliary device for an industrial robot using a forklift including an opening and a dedicated component externally attached to a base unit so that the receiving unit of the fork is located such that the center of gravity of the entire robot is located between the two forks and it is inserted to the receiving unit of the fork while the main body of the robot maintains a stable transport.

A small machine tool may also be moved and installed using a lift. In this case, the insertion position of the lift is not determined in many cases, and when the position of a movable unit and the weight of a load placed on the movable unit such as the upper surface of the table are not the same on every moving work, the position of the center of gravity is also not the same, and therefore, it is necessary to determine the position of the lift in accordance with the position of the center of gravity.

JP 2010-211467 A discloses a machine tool having a numeric control device, in which the weight of the load is automatically estimated, and the performance of the acceleration/deceleration of the movable unit is determined by multiple parameters defining a time constant and a command value of a moving speed optimized based on the information.

In the positioning work of the lift in the technique described in conventional techniques and JP 2005-131715 A, the position of the center of gravity is predicted, and the lift is raised at a temporary position, and the position is corrected in view of the balance, and this is repeatedly tried several times, so that a stable position is ultimately determined. In this case, when the position of the center of gravity predicted at first is significantly different from the true position of the center of gravity, the number of times the correction is tried increases, which increase the number of steps, and when raising and lowering is repeated, stress may be given to the mechanical components.

SUMMARY OF THE INVENTION

Therefore, it is an object of the present invention to provide a machine tool having a numeric control device, which can estimate the position of the center of gravity of the machine tool according to an easy method.

A machine tool having a numeric control device according to the present invention includes the numeric control device and a machine tool controlled by the numeric control device and including a fixed unit and a movable unit, wherein a load can be placed on the movable unit of the machine tool, and the numeric control device includes storage unit storing a weight and a position of a center of gravity of the fixed unit and the movable unit, and a gravity center position calculation unit configured to calculate a position of a center of gravity of an entire set including the machine tool and the load, and any one of the machine tool and the numeric control device is provided with a gravity center position display unit configured to display the position of the center of gravity calculated by the gravity center position calculation unit, and the gravity center position calculation unit is configured to calculate the position of the center of gravity of the entire set including the machine tool and the load, on the basis of the position of the center of gravity and the weight of the fixed unit and the position of the center of gravity and the weight of the movable unit stored in the storage unit, and a relative position of the movable unit with respect to the fixed unit, and the position of the center of gravity and the weight of the load.

In accordance with the position of the movable unit of the machine tool, the position of the center of gravity of the entire set including the machine tool and the load can be estimated. Therefore, when the moving and installing work of the machine tool is performed using a device such as a forklift, the work can be done while finding the position of the center of gravity of the machine tool, and therefore, the work can be done with a stable posture.

The numeric control device may have an input unit capable of inputting the weight of the load placed on the movable unit.

The input unit is provided to allow a user to directly input the value of the weight when the weight of the load is already known, so that the user can directly input the weight and calculate the position of the center of gravity of the entire set including the machine tool and the load using the value.

The numeric control device may include a load weight estimation unit configured to estimate the weight of the load placed on the movable unit from a value of a parameter group related to acceleration or deceleration performance of the movable unit, and transmit the weight to the gravity center position calculation unit.

Even when the weight of the load is unknown, the acceleration or deceleration parameter of the movable unit according to the load is set in advance, so that the weight of the load can be estimated from these values, and the position of the center of gravity of the entire set including the machine tool and the load can be calculated.

The machine tool may include a reference position mark, and the gravity center position calculation unit may calculate a vector quantity connecting the reference position mark and the position of the center of gravity of the entire set including the machine tool and the load, and the gravity center position calculation unit may output at least a direction component of the vector quantity as a direction and a distance based on the reference position mark.

When the machine tool is lifted by the forklift and the like, the forks are extending in the insertion direction, and therefore, there is less effect caused by deviation in the position of the center of gravity in terms of the insertion direction. In such case, it is sufficient to find the position of the center of gravity in terms of the lateral direction of the forks, but according to the invention of claim 4, the position of the center of gravity in the lateral direction can be found from only the information about the distance from the reference position in terms of the lateral direction.

The machine tool may include a plurality of marks arranged on a particular plane of the fixed unit of the machine tool, and the gravity center position calculation unit may project the position of the center of gravity of the entire set including the machine tool and the load onto the particular plane as a projected position of the center of gravity, and output, as a determination result, a number of a mark, which is closest to the projected position of the center of gravity, from among the plurality of marks.

In particular, when a forklift and the like are inserted in a direction perpendicular to a particular surface of the fixed unit of the machine tool when the machine tool is lifted by the forklift and the like, multiple marks are provided on the surface, and the position of the center of gravity in the lateral direction of the forks can be found as the position of any of the multiple marks.

The present invention has the above configuration, and can provide the machine tool of the machine tool having the numeric control device, wherein the position of the center of gravity of the machine tool can be estimated using an easy method.

BRIEF DESCRIPTION OF THE DRAWINGS

The above and the other objects and features of the present invention will become apparent from the description about embodiment below with reference to appended drawings. Among these drawings.

DETAILED DESCRIPTION OF THE PREFERRED EMBODIMENTS

First Embodiment

Figure 1:
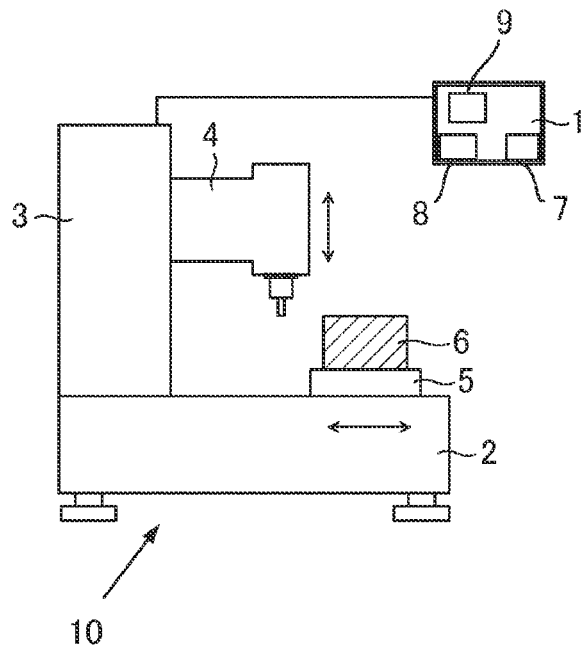
FIG. 1 is a schematic diagram illustrating a machine tool having a numeric control device according to an embodiment of the present invention.

FIG. 1 is a schematic diagram illustrating a machine tool having a numeric control device to which an embodiment of the present invention is applied. Numeral 1 denotes a numeric control device, which includes a CPU 7 and a memory 8 therein, and includes a display device 9 on the surface thereof. The numeric control device 1 is connected to a machine tool 10. The machine tool 10 includes a bed 2, a column 3, a spindle head 4, a table 5, and the like. Numeral 6 denotes a workpiece, i.e., a load, placed on the upper surface of the table 5. The bed 2 and column 3 are stationary with respect to the contacting ground surface, and correspond to a "fixed unit" as recited in claims. The spindle head 4 and the table 5 receive control commands from the numeric control device 1 to relatively move with respect to the fixing unit of the bed 2 and the column 3. The spindle head 4 and the table 5 correspond to a "movable unit" as recited in claims.

The memory 8 in the numeric control device 1 stores, in advance, the position of the center of gravity and the weight of the fixed unit such as the bed 2 and the column 3 in the machine tool 10 and the position of the center of gravity and the weight of the movable unit such as the spindle head 4 and the table 5. The CPU 7 calculates the position of the center of gravity of the entire set including the machine tool 10 and the workpiece 6 from the relative position of the movable unit such as the spindle head 4 and the table 5 with respect to the fixed unit and information about the position of the center of gravity and the weight of the workpiece 6 placed on the table 5 obtained according to a predetermined method. A more specific calculation method will be explained later.

The display device 9 displays the position of the center of gravity of the entire set including the machine tool 10 and the workpiece 6 calculated by the CPU 7. When the position of the center of gravity is displayed, only the information about the component only in at least any one of the directions may be displayed.

Information about the position of the center of gravity and the weight of the workpiece 6 is input by a worker using input unit 11, not shown, provided on the numeric control device 1. When the relationship between the position of the center of gravity and the weight of the workpiece 6 placed on the table 5 and the parameter obtained when the table 5 is accelerated or decelerated is set within the memory 8 of the numeric control device 1, the weight and the position of the center of gravity of the loaded workpiece 6 can be estimated and used from the parameter obtained when the table 5 is accelerated or decelerated by moving the table 5 carrying the workpiece 6.

Figure 2:
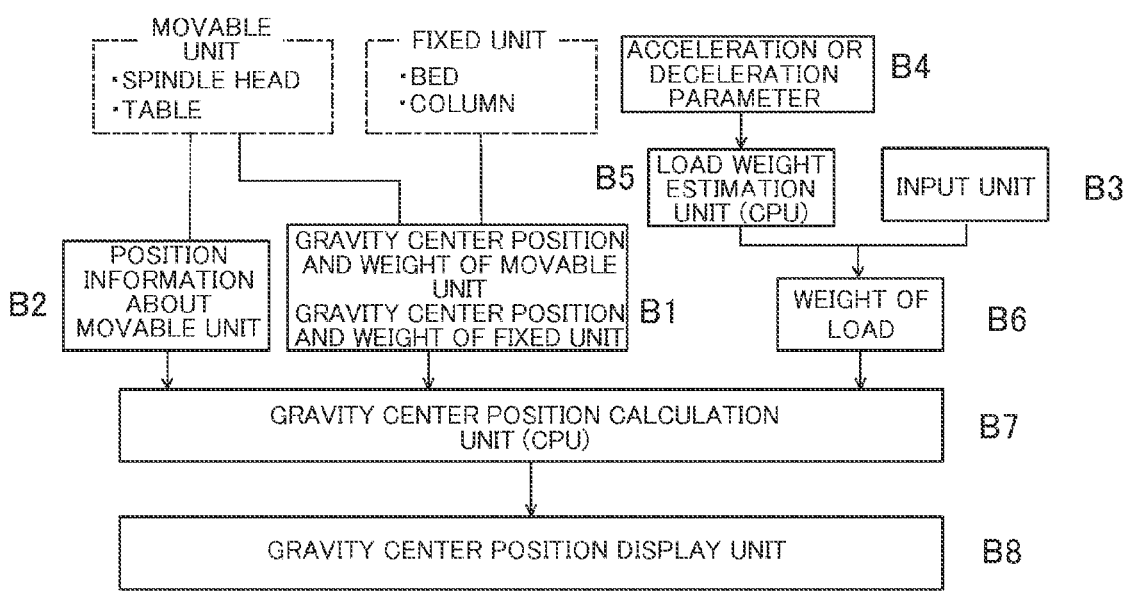
FIG. 2 is a block diagram illustrating a calculation method for calculating the position of the center of gravity of the entire set including the machine tool and a workpiece.

FIG. 2 is a block diagram illustrating a calculation method for calculating the position of the center of gravity of the entire set including the machine tool 10 and the workpiece 6 using the information about the position of the center of gravity and the weight of the workpiece 6. Hereinafter each block will be explained.

First of all, members constituting the machine tool 10 will be considered by being divided into the fixed unit which is still with respect to the installation surface and the movable unit which is relatively movable with respect to the fixed unit. In the present embodiment, the fixed unit includes the bed 2 and the column 3, and the movable unit includes the spindle head 4 and the table 5. First, in block B1, the values of the position of the center of gravity and the weight of the movable unit and the position of the center of gravity and the weight of the fixed unit are obtained. In block B2, the position information about the movable unit is obtained. In block B3, the weight of the workpiece 6 is input by the worker using the input unit 11, or as described in block B4, the value of the parameter obtained when the table 5 carrying the workpiece 6 is moved to be accelerated or decelerated is used to estimate the load weight of the workpiece 6 in block B5. According to any one of the methods, the load weight of the workpiece 6 is determined in block B6.

In block B7, the position of the center of gravity of the entire set including the machine tool 10 and the workpiece 6 is calculated using the position information about the movable unit, the position of the center of gravity and the weight of the movable unit, the position of the center of gravity and the weight of the fixed unit, and the weight of the workpiece. Then, the value of the position of the center of gravity of the entire set calculated is displayed on the display device 9 in block B8.

Subsequently, a specific calculation method of the position of the center of gravity will be explained. First, when the workpiece 6 is not placed, the position of the center of gravity of the machine tool 10 is calculated by the following expression.

$$\vec{r} = \frac{M_S\vec{r}_S + M_H\vec{r}_H + M_T\vec{r}_T + M_L\vec{r}_L}{M} \quad (1)$$

$$M = M_S + M_H + M_T + M_L$$

$\vec{r}$: the vector of the position of the center of gravity of the entire set including the fixed unit and the movable unit $\vec{r}_S$: the vector of the position of the center of gravity of fixed unit (bed, column, and the like)

$\vec{r}_H$: the vector of the position of the center of gravity of the spindle head $\vec{r}_T$: the vector of the position of the center of gravity of the table $\vec{r}_L$: the vector of the position of the center of gravity of the load placed on the table $M_S$: the total summation of the mass of the entire set including the fixed unit and the movable unit $M_S$: the total summation of the mass of the fixed unit (bed, column, and the like)

$M_H$: the mass of the spindle head $M_T$: the mass of the table $M_L$: the mass of the load placed on the table (2)

In this case, when the position of the center of gravity is calculated, components not required as information displayed on the display device 9 may be omitted from the process of calculation of the expression.

Figure 3:
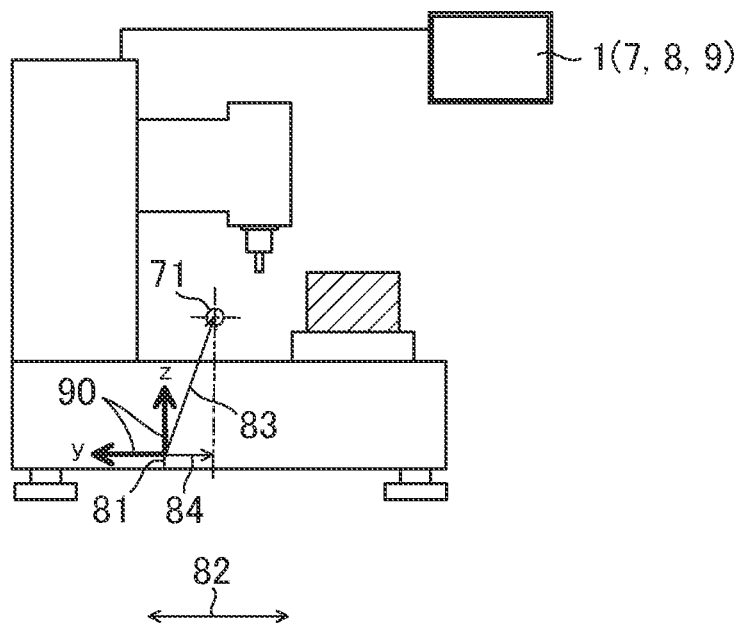
FIG. 3 is a diagram showing a calculation method for calculating the position of the center of gravity.

For example, as shown in FIG. 3, a reference coordinate system 90 is adopted in which a horizontal direction and a vertical direction are adopted as a basis, and the horizontal direction 82 matches the y direction which is the direction of the side surface when the machine tool is installed, and the vertical direction is the z direction.

In FIG. 3, in a case where the origin point in the y direction of the reference coordinate system 90 is configured to match the reference position mark 81 provided in the machine tool, the vector r in the expression (1) is equal to the vector 83 in FIG. 3, and the vector 84 which is the y direction component of the vector 83 is calculated by the following expression.

$$r_y = \frac{M_S r_{S_y} + M_H r_{H_y} + M_T r_{T_y} + M_L r_{L_y}}{M} \quad (3)$$

In this case, when the y direction component $r_{T_y}$ of the position of the center of gravity of the table 5 is deemed to be substantially equal to the y direction component $r_{T_y}$ of the position of the center of gravity of the workpiece 6, the information about the position of the center of gravity of the workpiece 6 can be omitted, and the expression (3) can be calculated and approximated as shown in the following expression.

$$r_y = \frac{M_S r_{S_y} + M_H r_{H_y} + (M_T + M_L) r_{T_y}}{M} \quad (4)$$

Then, the value of the y direction component of the vector r derived according to the expression (3) or expression (4) is displayed on the display device 9.

Figure 4:
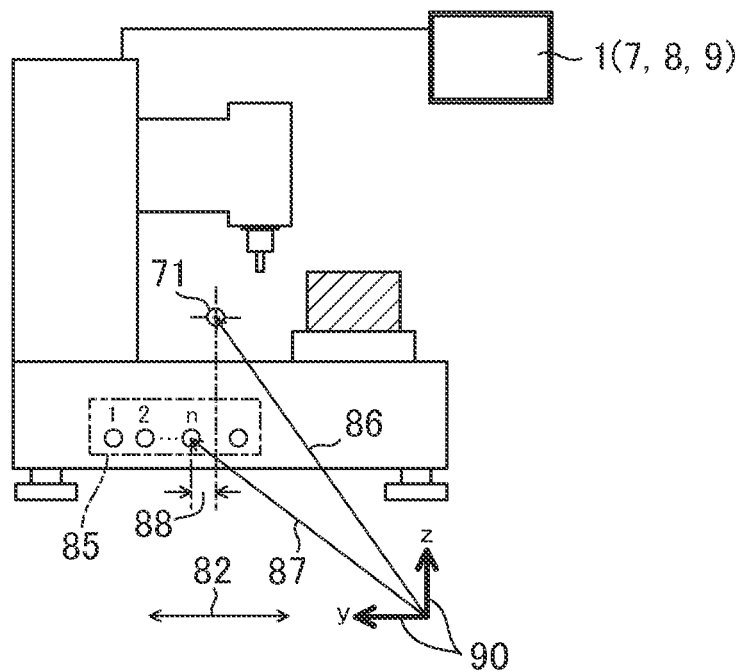
FIG. 4 is a diagram showing a calculation method for calculating the position of the center of gravity.

Subsequently, calculation and display of the position of the center of gravity using a mark group 85 including multiple marks will be explained. FIG. 4 illustrates the state in which the mark group 85 including multiple marks is provided on the machine tool 10. The mark group 85 is provided on a side surface of the bed 2 of the machine tool 10, and multiple marks are provided along the y direction on the plane in parallel with the yz plane of the reference coordinate system 90. As a result, multiple marks constituting the mark group 85 are formed at positions of which coordinate positions in the y direction are different from each other.

In this case, the projection point of the position of the center of gravity 71 on the yz plane matches the y direction component of the position vector 86 of the position of the center of gravity 71. Numeral 87 in FIG. 4 denotes the position vector of the n-th mark of the marks constituting the mark group 85, and when the y direction component of the position vector 87 is used, the distance 88 in the y direction between the n-th mark and the projection point of the position of the center of gravity 71 can be calculated by the following expression.

$$l_n = |(\vec{r} - \vec{r}_n)_y| = |r_y - r_{n_y}|$$

$l_n$: distance in the y direction between the n-th mark and the position of the center of gravity 71

$r_n$: the position vector of the n-th mark (5)

This distance 88 is calculated in order for each of the marks constituting the mark group 85, and a reference symbol such as a number of a mark when $l_n$ becomes the least is displayed on the display device 9 as a determination result of the position of the center of gravity.

Subsequently, an estimation method of the load weight of the workpiece 6 will be explained. In a case of a motion while the table 5 carries the workpiece 6 in the machine tool 10 of FIG. 1, the following motion equation is satisfied.

$$(M_T + M_L)\alpha = F_a - F_f$$

α: acceleration in the moving direction $F_a$: thrust $F_f$: frictional force received from driving system (6)

In this case, when the frictional force $F_f$ is considered to be disregarded for the sake of simplification of the calculation, the following expression is satisfied.

$$(M_T + M_L)|\alpha|_{max} = |F_a|_{max} \quad (7)$$

$$\therefore M_L = \frac{|F_a|_{max}}{|\alpha|_{max}} - M_T \quad (8)$$

The maximum output of the motor serving as the driving source is described in a brochure and the like, and therefore, if there were no loss of output at all, the maximum value $|F_a|_{max}$ of the thrust in the expression (8) is derived from calculation and can be used as an already-known value.

Figure 5:
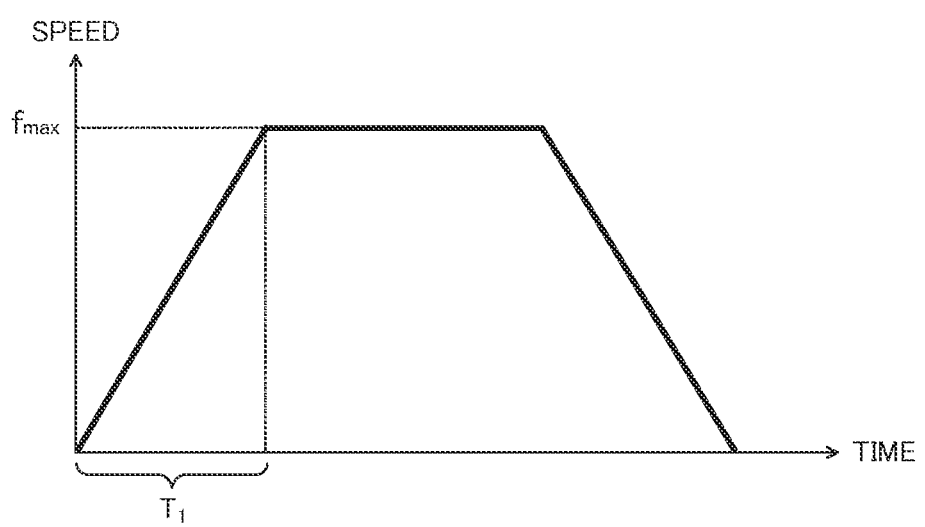
FIG. 5 is a figure illustrating an example of a speed and a time in a case where a movable unit in the machine tool performs fast-forward linear-type acceleration or deceleration.

FIG. 5 is a figure illustrating an example of a speed and a time in a case where the movable unit in the machine tool 10 performs fast-forward linear-type acceleration or deceleration. In general, when the movable unit moves fast-forward, the acceleration is controlled to attain the maximum value $|\alpha|_{max}$ in order to reduce the operation time to the minimum, and in the fast-forward movement in FIG. 5, $|\alpha|_{max}$ can be calculated by the following expression.

$$|\alpha|_{max} = \frac{f_{max}}{T_1}$$

$f_{max}$: maximum fast-forward speed $T_1$: time constant of fast-forward linear-type acceleration or deceleration (9)

Since $f_{max}$ and $T_1$ are given as the elements of the acceleration or deceleration parameters of the workpiece 6, $|\alpha|_{max}$ is derived from the expression (9) using these two parameters, and by using the value of $|\alpha|_{max}$, the mass (weight) $M_L$ of the workpiece 6 can be derived.

In general, in the motion equation of the expression (6), the frictional force $F_f$ needs to be taken into consideration. In this case, the fast-forward acceleration or deceleration characteristics are more complicated than the example shown in FIG. 5, and the definition may be made by many parameters, but even in this case, $M_L$ is calculated by solving the motion equation, and by using this derived value, the position of the center of gravity can be calculated.

The invention claimed is:

1. A machine tool having a numeric control device comprising the numeric control device and a machine tool controlled by the numeric control device and including a fixed unit and a movable unit,
   wherein a load can be placed on the movable unit of the machine tool, and
   the numeric control device includes:
      a storage unit storing a weight and a position of a center of gravity of the fixed unit and the movable unit; and
      a gravity center position calculation unit configured to calculate a position of a center of gravity of an entire set including the machine tool and the load,
   any one of the machine tool and the numeric control device is provided with a gravity center position display unit configured to display the position of the center of gravity calculated by the gravity center position calculation unit, and
   the gravity center position calculation unit is configured to calculate the position of the center of gravity of the entire set including the machine tool and the load, on the basis of the position of the center of gravity and the weight of the fixed unit and the position of the center of gravity and the weight of the movable unit stored in the storage unit, and a relative position of the movable unit with respect to the fixed unit, and the position of the center of gravity and the weight of the load,
   wherein the numeric control device includes a load weight estimation unit configured to estimate the weight of the load placed on the movable unit from a value of a parameter group related to acceleration or deceleration performance of the movable unit, and transmit the weight to the gravity center position calculation unit.

2. The machine tool according to claim 1, wherein
   the fixed unit includes a bed and a column, and the movable unit includes a spindle head and a table, and
   the spindle head is movable relative to the column, and the table is movable relative to the bed.

3. The machine tool according to claim 1, wherein
   the numeric control device includes an input unit configured to input the weight of the load placed on the movable unit.

4. A machine tool having a numeric control device comprising the numeric control device and a machine tool controlled by the numeric control device and including a fixed unit and a movable unit,
   wherein a load can be placed on the movable unit of the machine tool, and
   the numeric control device includes:
      a storage unit storing a weight and a position of a center of gravity of the fixed unit and the movable unit; and
      a gravity center position calculation unit configured to calculate a position of a center of gravity of an entire set including the machine tool and the load,
   any one of the machine tool and the numeric control device is provided with a gravity center position display unit configured to display the position of the center of gravity calculated by the gravity center position calculation unit, and
   the gravity center position calculation unit is configured to calculate the position of the center of gravity of the entire set including the machine tool and the load, on the basis of the position of the center of gravity and the weight of the fixed unit and the position of the center of gravity and the weight of the movable unit stored in the storage unit, and a relative position of the movable unit with respect to the fixed unit, and the position of the center of gravity and the weight of the load,
   wherein the machine tool includes a reference position mark, and
   the gravity center position calculation unit is configured to calculate a vector quantity connecting the reference position mark and the position of the center of gravity of the entire set including the machine tool and the load, and
   the gravity center position calculation unit outputs at least a direction component of the vector quantity as a direction and a distance based on the reference position mark.

5. The machine tool according to claim 4, wherein
   the gravity center position calculation unit is configured to calculate the vector quantity of two or more direction components, and
   the gravity center position display unit is configured to display only the information about one of the direction components.

6. The machine tool according to claim 4, wherein
the fixed unit includes a bed and a column, and the movable unit includes a spindle head and a table, and
the spindle head is movable relative to the column, and the table is movable relative to the bed.

7. The machine tool according to claim 4, wherein
the numeric control device includes an input unit configured to input the weight of the load placed on the movable unit.

8. A machine tool having a numeric control device comprising the numeric control device and a machine tool controlled by the numeric control device and including a fixed unit and a movable unit,
   wherein a load can be placed on the movable unit of the machine tool, and
   the numeric control device includes:
      a storage unit storing a weight and a position of a center of gravity of the fixed unit and the movable unit; and
      a gravity center position calculation unit configured to calculate a position of a center of gravity of an entire set including the machine tool and the load,
   any one of the machine tool and the numeric control device is provided with a gravity center position display unit configured to display the position of the center of gravity calculated by the gravity center position calculation unit, and
   the gravity center position calculation unit is configured to calculate the position of the center of gravity of the entire set including the machine tool and the load, on the basis of the position of the center of gravity and the weight of the fixed unit and the position of the center of gravity and the weight of the movable unit stored in the storage unit, and a relative position of the movable unit with respect to the fixed unit, and the position of the center of gravity and the weight of the load,
   wherein the machine tool includes a plurality of marks arranged on a particular plane of the fixed unit of the machine tool, and
   the gravity center position calculation unit is configured to project the position of the center of gravity of the entire set including the machine tool and the load onto the particular plane as a projected position of the center of gravity, and output, as a determination result, a number of a mark, which is closest to the projected position of the center of gravity, from among the plurality of marks.

9. The machine tool according to claim 8, wherein
the fixed unit includes a bed and a column, and the movable unit includes a spindle head and a table, and
the spindle head is movable relative to the column, and the table is movable relative to the bed.

10. The machine tool according to claim 8, wherein
the numeric control device includes an input unit configured to input the weight of the load placed on the movable unit.

* * * * *